(12) United States Patent
Gretz (10) Patent No.: US 6,932,390 B1
(45) Date of Patent: Aug. 23, 2005

(54) SWIVEL FITTING

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 10/281,860

(22) Filed: Oct. 28, 2002

(51) Int. Cl.[7] ............................................. F16L 27/00
(52) U.S. Cl. ........................ 285/184; 285/181; 285/272
(58) Field of Search .............................. 285/181, 184, 285/272

(56) References Cited

U.S. PATENT DOCUMENTS

| | | | |
|---|---|---|---|
| 327,877 A * | 10/1885 | Hodges | 285/184 |
| 1,015,904 A * | 1/1912 | Niederlander | 285/94 |
| 1,285,849 A * | 11/1918 | Walling | 29/418 |
| 1,605,507 A * | 11/1926 | Burke | 285/98 |
| 1,880,098 A * | 9/1932 | Mair | 285/184 |
| 2,447,947 A * | 8/1948 | Larson et al. | 285/181 |
| 2,479,580 A * | 8/1949 | Marco | 285/331 |
| 5,064,226 A | 11/1991 | Klas | |
| 5,373,106 A | 12/1994 | O'Neil | |
| 5,566,989 A * | 10/1996 | Boing et al. | 285/144.1 |
| 6,043,432 A | 3/2000 | Gretz | |
| 6,114,631 A | 9/2000 | Gretz | |
| 6,561,549 B1 * | 5/2003 | Moris et al. | 285/184 |

* cited by examiner

Primary Examiner—James M. Hewitt (57) ABSTRACT

A swivel fitting comprising a tubular entry member and a tubular exit member, the internal diameter of the tubular exit member being larger than the internal diameter of the tubular entry member, thus facilitating the transition of an inserted cable or cable or wire bundle from the tubular entry member to the tubular exit member even when the connector is configured at an angle of less than 180 degrees. Planar, relatively rotatable and mating flanges located at the exit end of the entry member and the input end of the exit member provide a common centerline and are joined by means of a threaded collar, thereby permitting configuration of the swivel fitting at angles between about 90 and 180 degrees.

8 Claims, 7 Drawing Sheets

SWIVEL FITTING

FIELD OF THE INVENTION

The present invention relates to connectors for the installation of electrical cable and more particularly to such a connector that is capable of swiveling between 90 and 180 degrees to provide secure and protected fastening to an electrical cable to, for example, a distribution or circuit box.

BACKGROUND OF THE INVENTION

U.S. Pat. No. 6,114,631 to Gretz describes a swivel fitting for electrical conduit or pipes that, while providing the variability of angular configuration of similar prior art couplings, is easy to assemble and also provides a relatively smooth internal conduit for the easy insertion and installation of electrical cable or communications wiring without the need for the application of any undue stress thereon imposed by twisting, maneuvering or hard pushing. The swivel fitting described in this reference includes a pair of tubular members each having an internal diameter of approximately the same dimension. While this swivel fitting generally provides adequate access to its interior without the application of any undue stress upon an inserted cable or communications wire, it has been found that in certain applications where the cable or communications wire is inserted after the connector has been located in its angular configuration, i.e. not at an angle of 180 degrees, there often remains a certain amount of resistance to insertion as the inserted cable or wire "turns the corner" within the fitting. This is in large part due to the fact that the installer often tries to insert as much cable or wire as possible into a single fitting thus, "filing up" the input side of the fitting, thereby making it difficult for the cable or wire to "turn the corner" at the point inside of the fitting where angular change occurs. It would thus be desirable to have a swivel fitting that avoids such binding of inserted cable or wire at the point of angular change as just described.

OBJECT OF THE INVENTION

It is therefore an object of the present invention to provide a swivel fitting capable of angular orientation at angles from about 90 to about 180 degrees that allows for easy insertion of a cable, a bundle of cables or a bundle of wires even in an angular configuration of less than 180 degrees without the need to apply any undue stress to the inserted cable or wire.

SUMMARY OF THE INVENTION

According to the present invention, there is provided a swivel fitting comprising a tubular entry member and a tubular exit member, the internal diameter of the tubular exit member preferably being larger than the internal diameter of the tubular entry member, thus facilitating the transition of an inserted cable or cable or wire bundle from the tubular entry member to the tubular exit member even when the connector is configured at an angle of less than 180 degrees. Planar, relatively rotatable and mating flanges located at the exit end of the entry member and the input end of the exit member provide a common centerline and are joined by a variety of mechanisms, thereby permitting configuration of the swivel fitting at angles between about 90 and 180 degrees.

DETAILED DESCRIPTION

Figure 1:
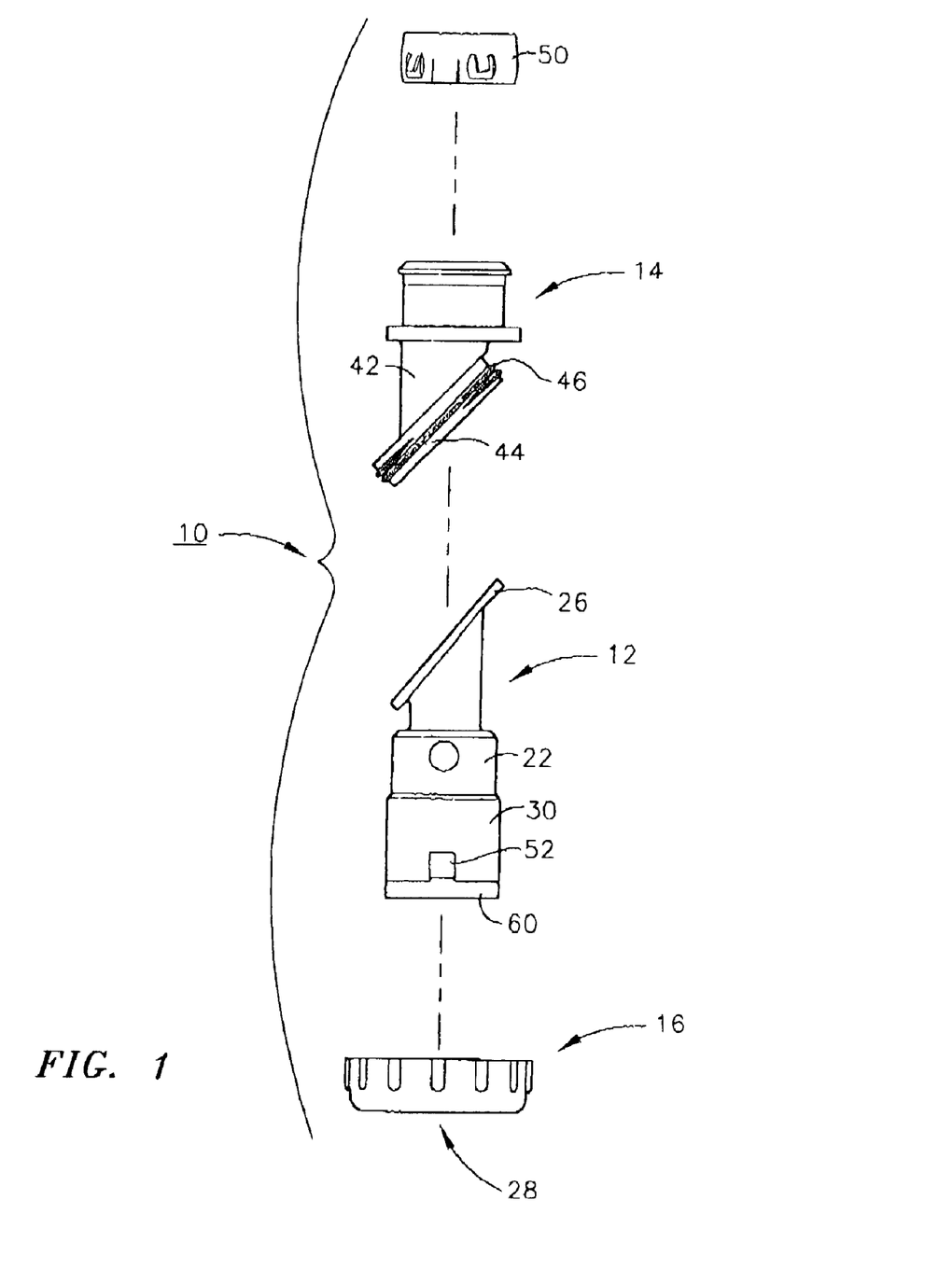
FIG. 1 is an exploded view of the swivel fitting of the present invention.

As shown in FIG. 1, the swivel fitting 10 of the present invention comprises an entry member 12, an exit member 14 and a collar 16.

Figure 2:
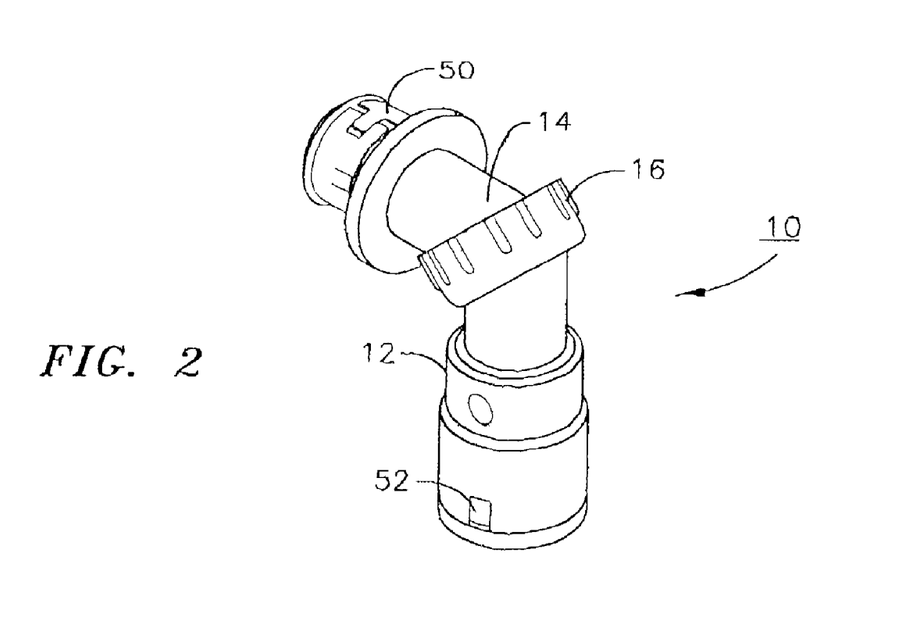
FIG. 2 is a perspective view of the swivel fitting of the present invention configured at an angle of less than 180 degrees.
Figure 3:
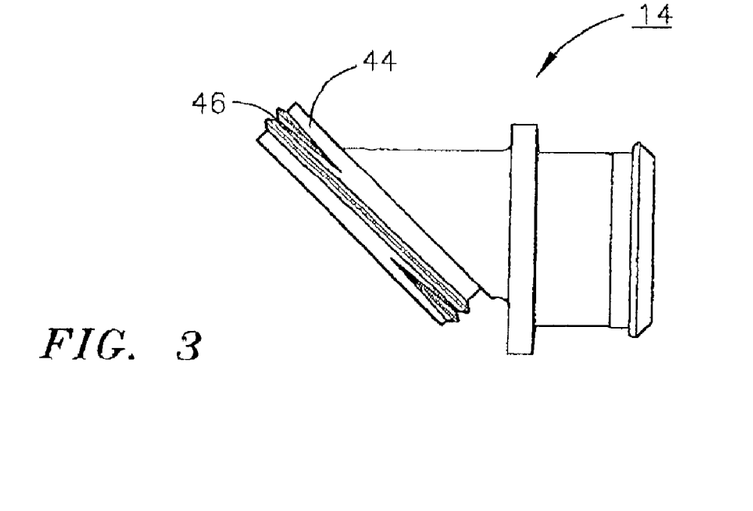
FIG. 3 is a side view of the exit portion of the swivel fitting of the present invention.
Figure 8:
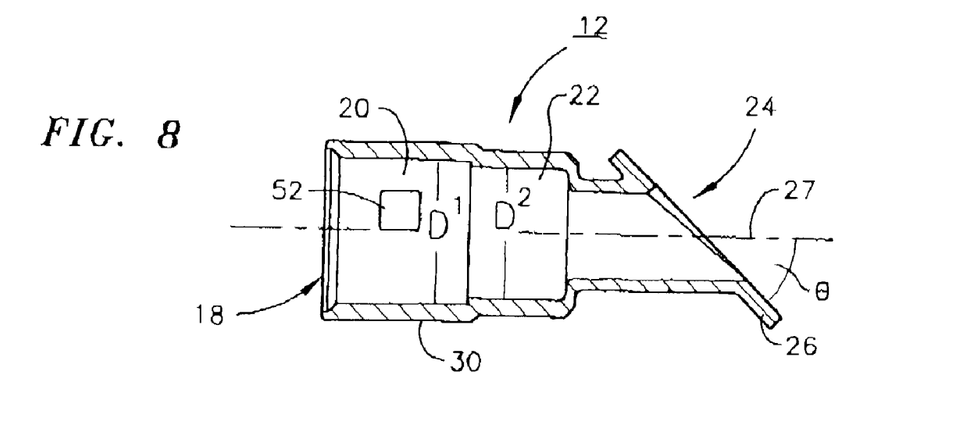
FIG. 8 is a cross-sectional view of the entry portion of the swivel fitting of the present invention along the line 8—8 of FIG. 9.
Figure 9:
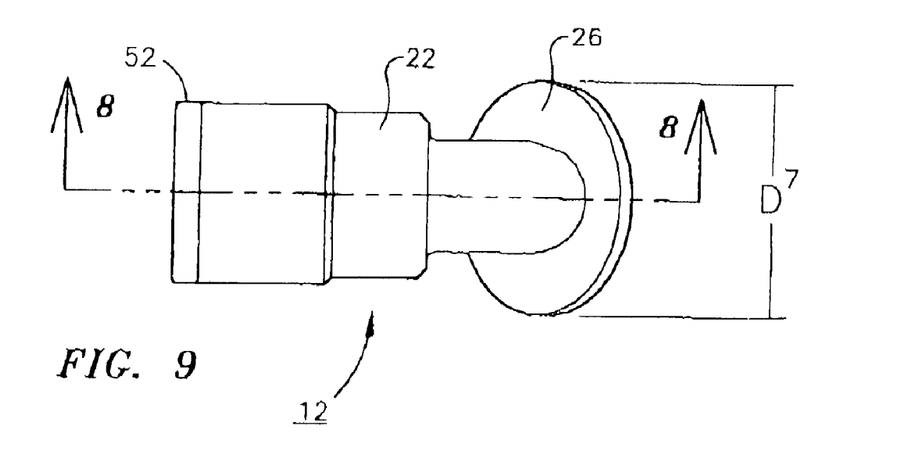
FIG. 9 is a top view of the entry portion of the swivel fitting of the present invention.
Figure 10:
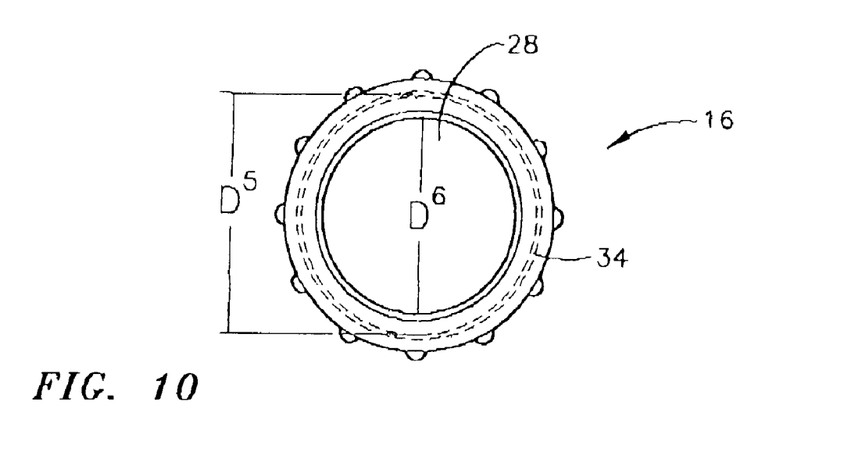
FIG. 10 is a partially phantom end view of the collar of the swivel fitting of the present invention.

Referring now to FIG. 8, entry member 12 comprises a first end 18 having a first cylindrical portion 20 and a second cylindrical portion 22 the diameter $D^1$ of portion 20 being greater than diameter $D^2$ of portion 22. Entry member 12 has a second end 24 at the extremity of second cylindrical portion 22. Second end 24 of entry member 12 is surrounded by an annular flange 26 at an approximately 45 degree angle ⌀ from the centerline 27 of exit end 24. As best shown in FIGS. 1 and 2, collar 16 having a circular aperture 28 therein slideably and peripherally engages outer periphery 30 of entry member 12. The diameter of aperture 28, $D^6$ is adequate to allow collar 16 to pass over outer periphery 30 while the diameter $D^7$ of annular flange 26 is larger than the diameter of aperture 28 thus permitting collar 16 to pass over outer periphery 30 but to engage annular flange 26. Collar 16 has an overall diameter $D^5$ as defined by aperture 32 that lies inside of threads 34 shown in phantom in FIG. 10. Diameter $D^5$ is the same as the outer diameter of flange 44 described below.

Figure 5:
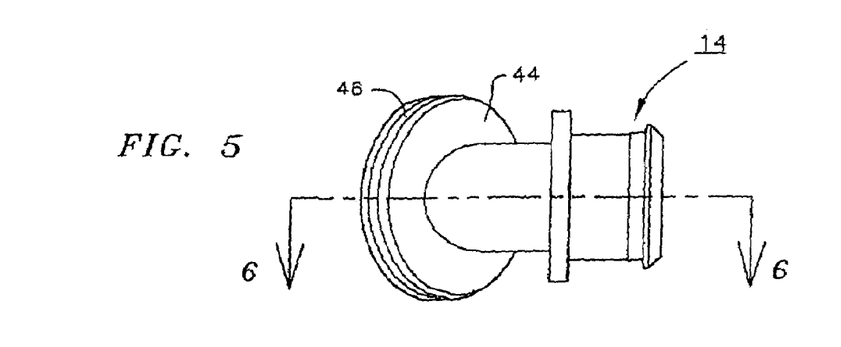
FIG. 5 is a top view of the entry portion of the swivel fitting of the present invention.
Figure 6:
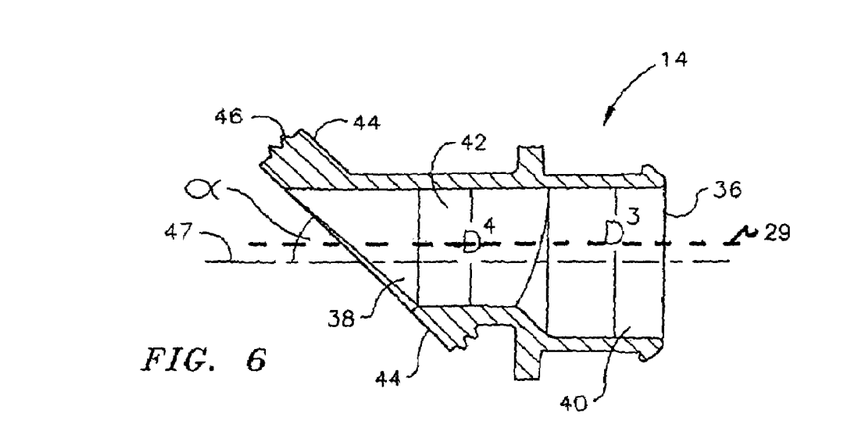
FIG. 6 is a cross-sectional view of the entry portion of the swivel fitting of the present invention along the line 6—6 of FIG. 5.
Figure 7:
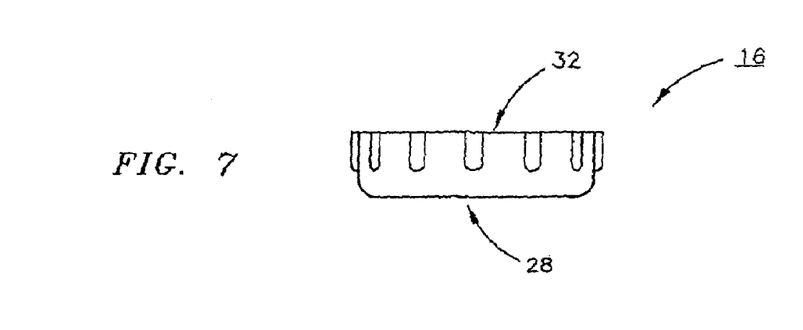
FIG. 7 is a side view of the collar of the swivel fitting of the present invention.

Referring now to FIGS. 5 and 6, exit member 14 comprises a first end 36, a second end 38, a first cylindrical interior 40 proximate first end 36 and a second cylindrical interior 42 proximate second end 38, diameter $D^3$ of first cylindrical interior 40 being of a larger diameter than diameter $D^4$ of second cylindrical interior 42 and diameter $D^4$ being of a larger diameter than $D^2$ previously described. Second end 38 of exit member 14 has an annular flange 44 about its periphery and annular flange 44 incorporates threads 46 about its outer periphery. Annular flange 44, like its counterpart annular flange 26 is oriented at a 45 degree angle to centerline 47 of exit portion 14.

Figure 4:
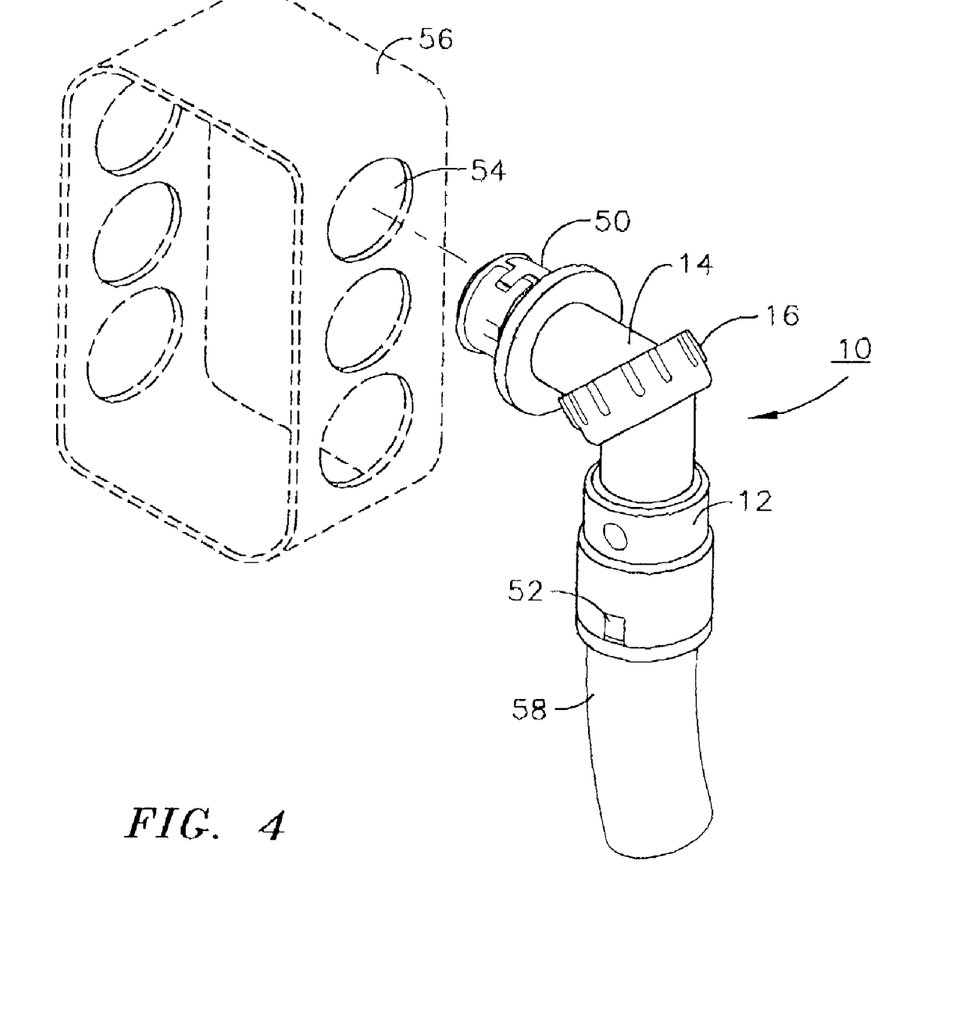
FIG. 4 is an exploded perspective view showing insertion of the swivel fitting of the present invention into a junction box.

Peripheral flanges 26 and 44 are of approximately the same diameter and as best seen in FIG. 1, when swivel fitting 10 is assembled, meet in facing relationship with each other with centerlines 27 and 47 in registration to provide a continuous cylindrical passage made up of portions 20, 22, 38 and 36. According to the preferred embodiment depicted in FIGS. 1–10, collar 16 about periphery 30 is then slid toward annular flange 26 and threads 34 engaged with threads 46 to draw entry member 12 toward exit member 14. With annular flanges 26 and 46 in contacting relationship, swivel fitting 10 can be rotated by relative rotation of entry member 12 and exit member 14 to any angle ranging from 180 degrees as shown in FIG. 1 to 90 degrees as shown in FIGS. 2 and 4. Once arranged at the proper angle, entry portion 12 and exit portion 14 are fastened together by tightening collar 16 about threads 46. While, as described above, when assembled as shown in FIG. 1, centerlines 27 and 47 are in registration, it will be readily apparent from a study of FIG. 6 that when thus assembled, centerline 29 of diameter $D^4$ of second cylindrical interior 42 is offset from centerlines 27 and 47 because of the differences in dimensions between diameters $D^3$ and $D^4$.

Because of the relative differences in the diameters of interior portions 22 and 42, cable or cable or wire bundles inserted into interior portion 22 are of necessity small enough as to be readily inserted into interior portion 42 with little if any maneuvering. Thus, the problems of cable or wire stress encountered with similar prior art fittings referred to above are avoided.

As shown in FIG. 4, swivel fitting 10 preferably incorporates a pair of additional fittings 50 and 52. These devices are described in U.S. Pat. No. 6,043,432 in the case of quick connect/disconnect fitting 50 and in U.S. Pat. No. 5,373,106 in the case of cable or cable or wire bundle securing device 52. The disclosures and descriptions contained in these patents are hereby incorporated herein by reference in their entireties as if the entire specifications, drawings and claims thereof were specifically recited herein. The best examples of these members for incorporation into the swivel fitting of the instant invention are, in the case of element 50, that shown in FIG. 2 of U.S. Pat. No. 6,043,432 and for element 52, those depicted in FIGS. 18 through 23 of U.S. Pat. No. 5,373,106. As will be clear to the skilled artisan element 50 engages about the outer periphery of reduced diameter portion 62 of exit member 14 while element 52 is inserted into tubular interior portion 20 of entry member 12 as shown in the accompanying drawings.

As best shown in FIG. 4 installation of swivel fitting 10 in a junction box 56 is accomplished by insertion of quick connect/disconnect fitting 50 (as described in U.S. Pat. No. 6,043,432) into aperture 54 in junction box 56. Cable or cable or wire bundle securing device 52 on the other hand is inserted into cylindrical portion 20 of entry portion 12 to assist with the retention of inserted cable or wiring 58 as described in aforementioned U.S. Pat. No. 5,373,106.

According to a highly preferred embodiment, swivel connector 10 includes a polymeric or similar cylindrical insert 60 in first end 18 of entry portion 12 to protect inserted cable or wiring 58 from abrasion during and after installation.

Figure 11:
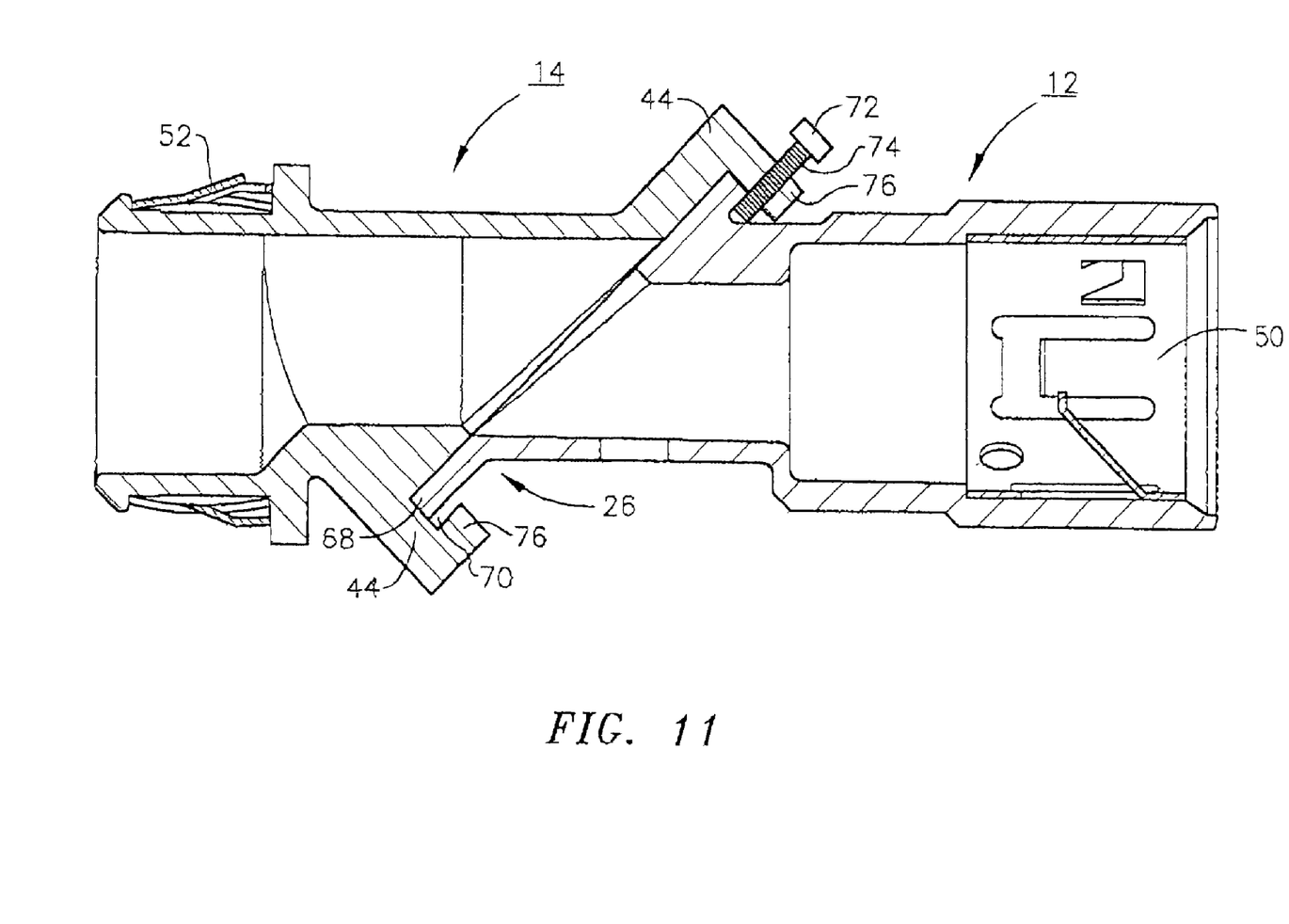
FIG. 11 is a cross-sectional view of another embodiment of the swivel fitting of the present invention.
Figure 12:
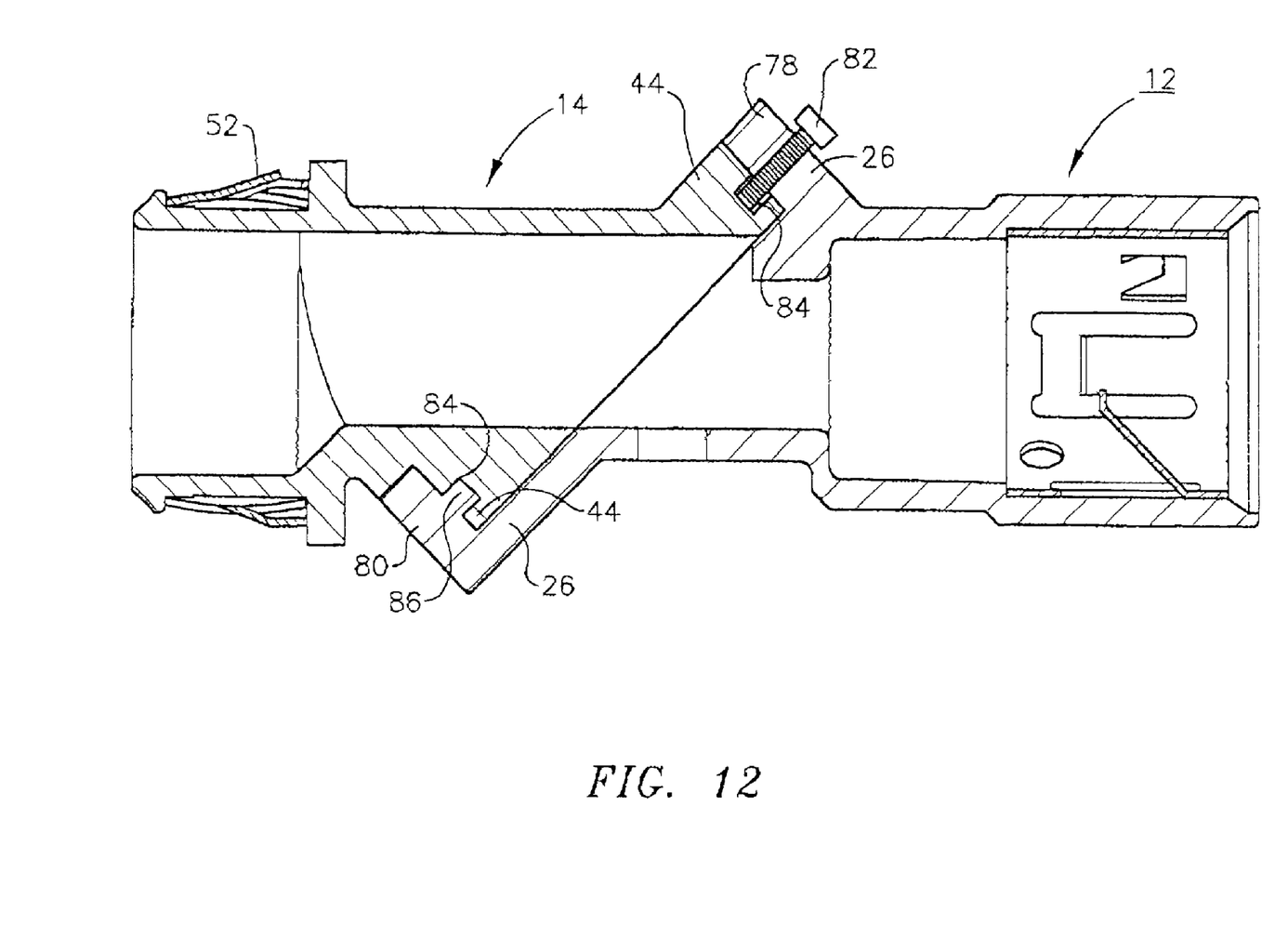
FIG. 12 is a cross-sectional view of yet another alternative embodiment of the swivel fitting of the present invention.

Referring now to FIGS. 11 and 12 that depict alternative embodiments of the present invention, swivel fitting 10 remains essentially the same as regards the principal elements, members 12 and 14 including fittings 50 and 52, but the structure of flange 44 is altered to provide an alternative means of rotatably attaching portions 12 and 14. As depicted in FIG. 11, flange 26 of member 12 inserts into a mating channel 70 formed in annular flange 44 of member 14. A bolt 72, thumb screw or the like is inserted through an aperture 74 in an extension 76 of annular flange 44 that serves to define channel 70. After insertion of annular flange 26 into channel 70 and rotation to the appropriate angle, bolt, thumb screw or the like 72 is tightened to hold members 12 and 14 in a fixed position relative to each other.

In the alternative embodiment depicted in FIG. 12, annular flange 26 is modified to provide extensions 78 and 80. Extension 78 provides an aperture for the insertion of bolt, thumb screw or the like fastener 82 into an annular recess 84 at the interior of annular flange 44, while extension 80 of annular flange 26 is provided with an annular tab 86 that engages annular recess 84. In accordance with this embodiment, assembly is accomplished by loosening bolt 82, so as not to interfere with the insertion of flange 44 into the area between extensions 78 and 80, engaging annular tab 86 with annular recess 84, rotating members 12 and 14 to the appropriate angle and then tightening bolt 82 to secure members 12 and 14 to each other.

As will be apparent to the skilled artisan, the arrangement of annular extensions 76 and 80 could be reversed between entry members 12 and exit member 14 such that annular extension 76 in FIG. 11 and annular extension 80 in FIG. 12 were incorporated into annular flange 26 instead of annular flange 44. In these embodiments, annular flange 44 would engage a channel 70 in a modified annular flange 26 and tab 86 would be incorporated into annular flange 44 and engage a recess 84 in annular flange 26.

As the invention has been described, it will be apparent to those skilled in the art that the same may be varied in many ways without departing from the spirit and scope of the invention. Any and all such modifications are intended to be included within the scope of the appended claims.

What is claimed is:

1. A quick connect swivel fitting comprising:
   A) an entry member having a first entry end, a first linear cylindrical interior entry portion proximate said first entry end, a second entry end having a second linear cylindrical interior entry portion proximate said second entry end and an angulated planar flange having an outer periphery about said second entry end;
   B) an exit member having a first exit end and a second exit end and having an outer surface, a first linear cylindrical interior exit portion proximate said first exit end and of a first diameter, a second linear cylindrical interior exit portion proximate said second exit end and of a second diameter, wherein said second linear cylindrical interior exit portion is in line with said first linear cylindrical interior exit portion, an angulated planar flange having an outer periphery about said second exit end, the centerlines of the diameters of said first and second linear cylindrical interior exit portions being offset;
   C) a mechanism for assembly of said entry and exit members with said angulated planar flanges of said entry member and said exit member facing each one another and, said mechanism for assembly further allowing rotation of said second entry end and second exit end to any desired angle between about 90 degrees and about 180 degrees relative to one another to provide a passageway therethrough of between 90 degrees and 180 degrees;
   D) an arrangement on said outer surface of said exit member for fastening in the opening of an electric box or panel.

2. The quick connect swivel fitting of claim 1 wherein said mechanism for assembly comprises a collar about said outer periphery of said planar flange of said entry member, said collar having an inner periphery and threads about said inner periphery that engage threads about the outer periphery of said planar flange of said exit member.

3. The quick connect swivel fitting of claim 2 further including a cylindrical insert in said entry member first end to inhibit abrasion to a cable or bundle of cables or wires inserted into said entry member first end.

4. The quick connect swivel fitting of claim 3 wherein said second entry end and said first exit end both have centerlines and said entry member and said exit member flanges are mounted at an angle of about 45 degrees from said second entry end and said first exit end centerlines so as to permit rotation of said entry and exit members relative to each other such that said quick connect swivel fitting defines an angle from 90 degrees to 180 degrees.

5. The quick connect swivel fitting of claim 1 wherein said first cylindrical interior exit portion has a quick connect fitting.

6. The quick connect swivel fitting of claim 5 wherein said quick connect fitting includes a spring metal ring.

7. The quick connect swivel fitting of claim 1 wherein said arrangement on said outer surface is a spring metal snap ring.

8. The quick connect swivel fitting of claim 1 wherein said second entry end and said first exit end both have centerlines and said entry member and said exit member flanges are mounted at an angle of about 45 degrees from said second entry end and said first exit end centerlines so as to permit rotation of said entry and exit members relative to each other such that said quick connect swivel fitting defines an angle from 90 degrees to 180 degrees.

* * * * *